US010480810B2

(12) United States Patent
Erdman et al.

(10) Patent No.: US 10,480,810 B2
(45) Date of Patent: Nov. 19, 2019

(54) HVAC CONTROLLER WITH STREAMLINED SETUP

(71) Applicant: Ademco Inc., Golden Valley, MN (US)

(72) Inventors: John Erdman, Eden Prairie, MN (US); Hyunki Kim, Rogers, MN (US)

(73) Assignee: Ademco Inc., Golden Valley, MN (US)

( * ) Notice: Subject to any disclaimer, the term of this patent is extended or adjusted under 35 U.S.C. 154(b) by 497 days.

(21) Appl. No.: 15/210,701

(22) Filed: Jul. 14, 2016

(65) Prior Publication Data

US 2018/0017274 A1 Jan. 18, 2018

(51) Int. Cl.
| | |
|---|---|
| G05B 15/02 | (2006.01) |
| F24F 11/62 | (2018.01) |
| F24F 11/30 | (2018.01) |
| F24F 11/56 | (2018.01) |
| F24F 11/54 | (2018.01) |
| F24F 11/52 | (2018.01) |
| F24F 11/64 | (2018.01) |
| F24F 120/20 | (2018.01) |
| F24F 110/00 | (2018.01) |

(52) U.S. Cl.
CPC .............. *F24F 11/62* (2018.01); *F24F 11/30* (2018.01); *G05B 15/02* (2013.01); *F24F 11/52* (2018.01); *F24F 11/54* (2018.01); *F24F 11/56* (2018.01); *F24F 11/64* (2018.01); *F24F 2110/00* (2018.01); *F24F 2120/20* (2018.01); *G05B 2219/25056* (2013.01); *G05B 2219/2614* (2013.01); *G05B 2219/2642* (2013.01)

(58) Field of Classification Search
CPC ........ F24F 11/62; F24F 11/30; F24F 2120/20; F24F 11/64; F24F 2110/00; F24F 11/56; F24F 11/52; F24F 11/54; G05B 15/02; G05B 2219/25056; G05B 2219/2614; G05B 2219/2642
USPC ........................................................ 700/277
See application file for complete search history.

(56) References Cited

U.S. PATENT DOCUMENTS

| | | | |
|---|---|---|---|
| 7,055,759 | B2 | 6/2006 | Wacker et al. |
| 7,634,504 | B2 | 12/2009 | Amundson |
| 8,544,285 | B2 | 10/2013 | Stefanski et al. |
| 8,571,518 | B2 | 10/2013 | Imes et al. |
| 8,606,409 | B2 | 12/2013 | Amundson et al. |
| 9,092,039 | B2 | 7/2015 | Fadell et al. |
| 9,116,529 | B2 | 8/2015 | Warren et al. |
| 9,291,359 | B2 | 3/2016 | Fadell et al. |
| 2003/0125843 | A1* | 7/2003 | Prasad .................. G06Q 10/06 700/291 |

(Continued)

OTHER PUBLICATIONS https://nest.com/support/article/A-step-by-step-guide-to-setup-on-the-Nest-Learning-Thermostat, "A Step-By-Step Guide to Setup on the Nest Learning Thermostat," 5 pages, printed Mar. 4, 2015.

*Primary Examiner* — Kenneth M Lo
*Assistant Examiner* — Michael W Choi
(74) *Attorney, Agent, or Firm* — Shumaker & Sieffert, P.A.

(57) ABSTRACT

An HVAC controller may be configured to control any of a variety of different types of HVAC systems that may include any of a variety of different HVAC components. The HVAC controller may be configured to solicit inputs from an installer or other user that enables the HVAC controller to help prioritize installer setup parameter settings for the HVAC controller to properly control the particular HVAC equipment that is present at the installation.

19 Claims, 21 Drawing Sheets

(56) References Cited

U.S. PATENT DOCUMENTS

| | | | |
|---|---|---|---|
| 2006/0161308 A1* | 7/2006 | Wang | G05D 23/1919 700/278 |
| 2007/0045441 A1 | 3/2007 | Ashworth et al. | |
| 2009/0292375 A1* | 11/2009 | Thompson | G08C 17/00 700/81 |
| 2012/0203379 A1* | 8/2012 | Sloo | G05D 23/1902 700/276 |
| 2013/0204440 A1* | 8/2013 | Fadell | F24F 11/30 700/276 |
| 2015/0144705 A1* | 5/2015 | Thiruvengada | F24F 11/30 236/1 C |
| 2015/0148963 A1 | 5/2015 | Klein et al. | |
| 2015/0219357 A1 | 8/2015 | Stefanski et al. | |
| 2015/0293541 A1 | 10/2015 | Fadell et al. | |
| 2015/0330654 A1 | 11/2015 | Matsuoka | |
| 2016/0025366 A1 | 1/2016 | Snow et al. | |
| 2016/0047569 A1 | 2/2016 | Fadell et al. | |

* cited by examiner

Table 1

SELECT ONLY ONE — 173

- Honeywell/Aube
- Carrier/Totaline
- Lux
- Pro 1
- Emerson/White Rodgers
- Braeburn
- Ecobee
- Nest
- Trane
- Venstar 175 ⟶ ▼Expand Name List

- Aprilaire
- Climate Technology
- Computime
- Easy Heat
- Fahrenheit
- Goodman
- Hunter
- Johnson Controls
- Lennox
- Lux
- Mitsubishi
- Orbit
- Payne
- PSG
- Radio Thermostat
- Rite Temp
- Ruud
- Schluter Systems
- Source 1
- TPI
- Bryant
- Comfor-Aire
- Dimplex
- Energate
- GE/General Electric
- HouseWarmer
- ICM Controls
- King Electric
- LG
- Maple Chase
- OJ Electronics
- Ouellet
- PECO
- Quiet Warmth
- Rheem
- Robertshaw
- Sanyo
- Smart Sense
- Tekmar
- Warmup

— 177

Other not found (call help line)

FIG. 12

Table 5A

Thermostat Setup Parameters
(basic for US MN forced air & fossil fuels)
- Sys type = 1 heat / 1 cool conventional
- Fan control = Furnace controls for heat
- Heat Stage 1 cycle rate = 5 CPH
- Cool Stage 1 cycle rate = 3 CPH
- Compressor Protect = 5 min off
- Temperature Display = °F
- Max Heat set-point = 90°F
- Min Cool set-point = 50°F
- Time Display = 12 hour am/pm
- Daylight Savings Time = Auto
- Time Zone = CST
- Local Time = Set from internet
- Date = Set from internet
- Setback schedule format = 5/2 day
- Backlight = 8 second after key press
- Temperature changeover = Manual

FIG. 14A

Table 5B

Thermostat Setup Parameters
(basic for Canada hot water & fossil fuels)
- Sys type = 1 heat
- Heat Stage 1 cycle rate = 3 CPH
- Zone Valves = Normally open/power close
- Temperature Display = °C
- Max Heat set-point = 32°C
- Time Display = 24 hour
- Daylight Savings Time = Auto
- Time Zone = EST
- Local Time = Set from internet
- Date = Set from internet
- Setback schedule format = 5/1/1 day
- Backlight = 8 seconds after key press

FIG. 14B

Table 5C

Thermostat Setup Parameters
(basic for US OR electric heat pumps)

- Sys type = 2 heat / 1 cool HP w/Aux Heat
- Fan control = thermostat for heat & cool
- Heat Stage 1 cycle rate = 3 CPH
- Heat Stage 2 (Aux) cycle rate = 9 CPH
- AUX Heat Type = Electric
- Cool Stage 1 cycle rate = 3 CPH
- HP Changeover valve = B (power for Heat)
- Compressor Protect = 5 min off
- Temperature Display = °F
- Max Heat set-point = 90°F
- Min Cool set-point = 50°F
- Time Display = 12 hour am/pm
- Daylight Savings Time = None
- Time Zone = PST
- Local Time = Set from internet
- Date = Set from internet
- Setback schedule format = 7 day
- Backlight = low cont & bright on key press
- Temperature changeover = Auto
- Auto changeover offset = 3°F

FIG. 14C

HVAC CONTROLLER WITH STREAMLINED SETUP

TECHNICAL FIELD

The present disclosure relates to Heating, Ventilation, and/or Air Conditioning (HVAC) systems, and more particularly to methods and systems for setting up such HVAC systems for a particular installation site.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted to an internal wall of the building and provides control signals to various HVAC components of the HVAC system. Typically, during installation, the HVAC controller must be setup by an installer to properly control the particular HVAC components installed at the site. To support this, many HVAC controllers provide a series of installer setup screens that are accessible by the installer to facilitate entry of appropriate setup parameters. There can be a significant number of parameters that must be setup. Thus, such a setup process can be time consuming and tedious.

SUMMARY

The disclosure is directed to methods and systems for setting up HVAC controllers for a particular installation site. In one example, an HVAC controller may be configured to control any of a variety of different types of HVAC systems that may include any of a variety of different HVAC components. The HVAC controller may be configured to solicit inputs from an installer or other user that enables the HVAC controller to properly control the HVAC equipment that is at the particular installation site.

In a particular example of the disclosure, an HVAC controller that is configured to control at least part of an HVAC system of a building includes a controller that is configured to operate an algorithm that at least partially controls the HVAC system of the building. The algorithm may reference a plurality of equipment setup parameters that setup the algorithm for controlling the particular HVAC equipment that is used in the HVAC system of the building. The HVAC controller includes a user interface that is operably coupled to the controller such that the controller may be configured to receive from a user via the user interface an indication of the geographic location of the HVAC system. In some cases, the controller may be configured to identify and display at least one likely parameter value for one or more of the plurality of equipment setup parameters based at least in part on the received indication of the geographic location of the HVAC system. The controller may be configured to receive a selection of a desired parameter value for one or more of the plurality of equipment setup parameters and may be configured to operate the algorithm referencing the desired parameter value to at least partially control the HVAC system of the building.

In another example of the disclosure, an HVAC controller that is configured to control at least part of an HVAC system of a building includes a controller that is configured to operate an algorithm that at least partially controls the HVAC system of the building. The algorithm may reference a plurality of equipment setup parameters that setup the algorithm for controlling the particular HVAC equipment that is used in the HVAC system of the building. The HVAC controller includes a display screen that is operably coupled to the controller such that the controller can display on the display screen an inquiry asking the user to provide a geographical location for the building. The controller may be configured to utilize the geographical location for the building to determine ranked parameter values for at least some of the equipment setup parameters and to display the determined ranked parameter values on the display screen for selection by the user.

In another example of the disclosure, a method of configuring an HVAC controller to operate one or more components of an HVAC system includes displaying on a user interface an inquiry asking a user to identify a geographical location for the HVAC controller. An identified geographical location may be received from the user in response to the inquiry. One or more subsequent inquiries based at least in part upon the identified geographical location may be displayed on the user interface and responses to the one or more subsequent inquiries may be received from the user. A set of equipment setup parameters usable by the HVAC controller in operating the one or more components of the HVAC system may be determined based at least in part on the responses to the one or more subsequent inquiries and one or more components of an HVAC system may be operated based at least in part on the determined set of equipment setup parameters.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following description of various illustrative embodiments of the disclosure in connection with the accompanying drawings, in which:

FIG. 12 provides a listing of thermostat manufacturers as referenced in the method shown in FIGS. 9A through 9D;

FIGS. 14A through 14C provide listings of possible configuration parameters as referenced in the method shown in FIGS. 9A through 9D.

Figure 1:
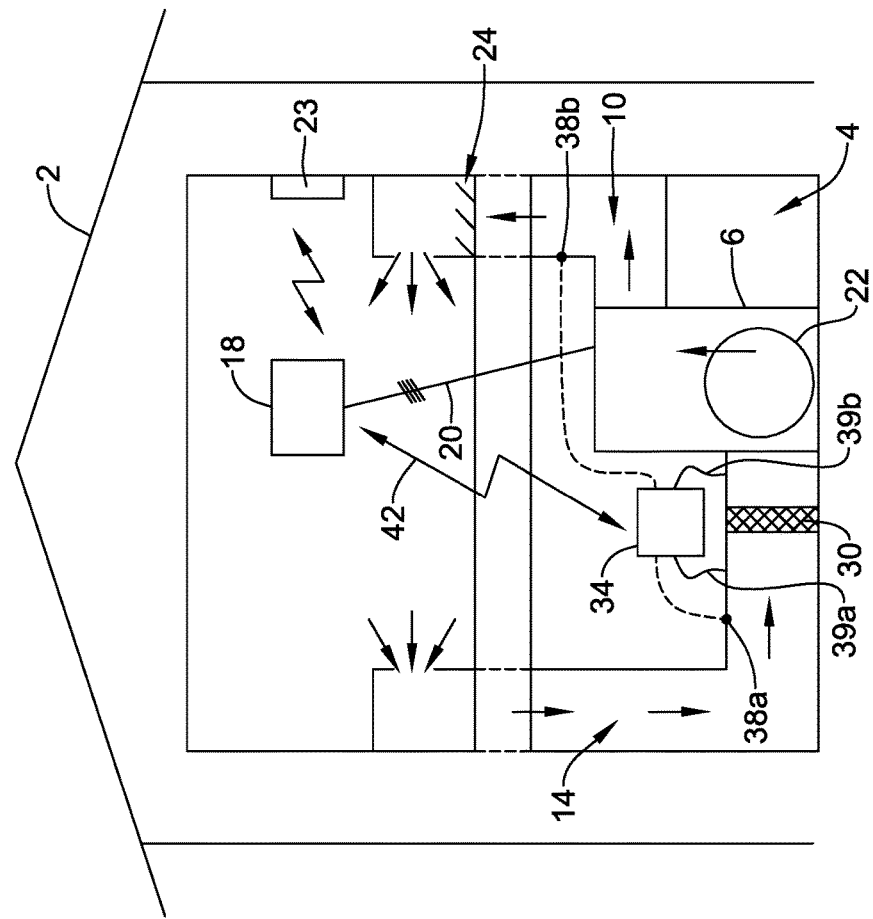
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The type of HVAC system and/or the particular HVAC equipment used may depend on the geographic region. For example, natural gas fired forced air furnaces may be more common in the northern regions of the Unites States, while electric heat may be more common in the southwest. Boiler systems may be more common in the northeast region of the United States, as well as in Europe. These are just some examples.

The illustrative forced air type HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
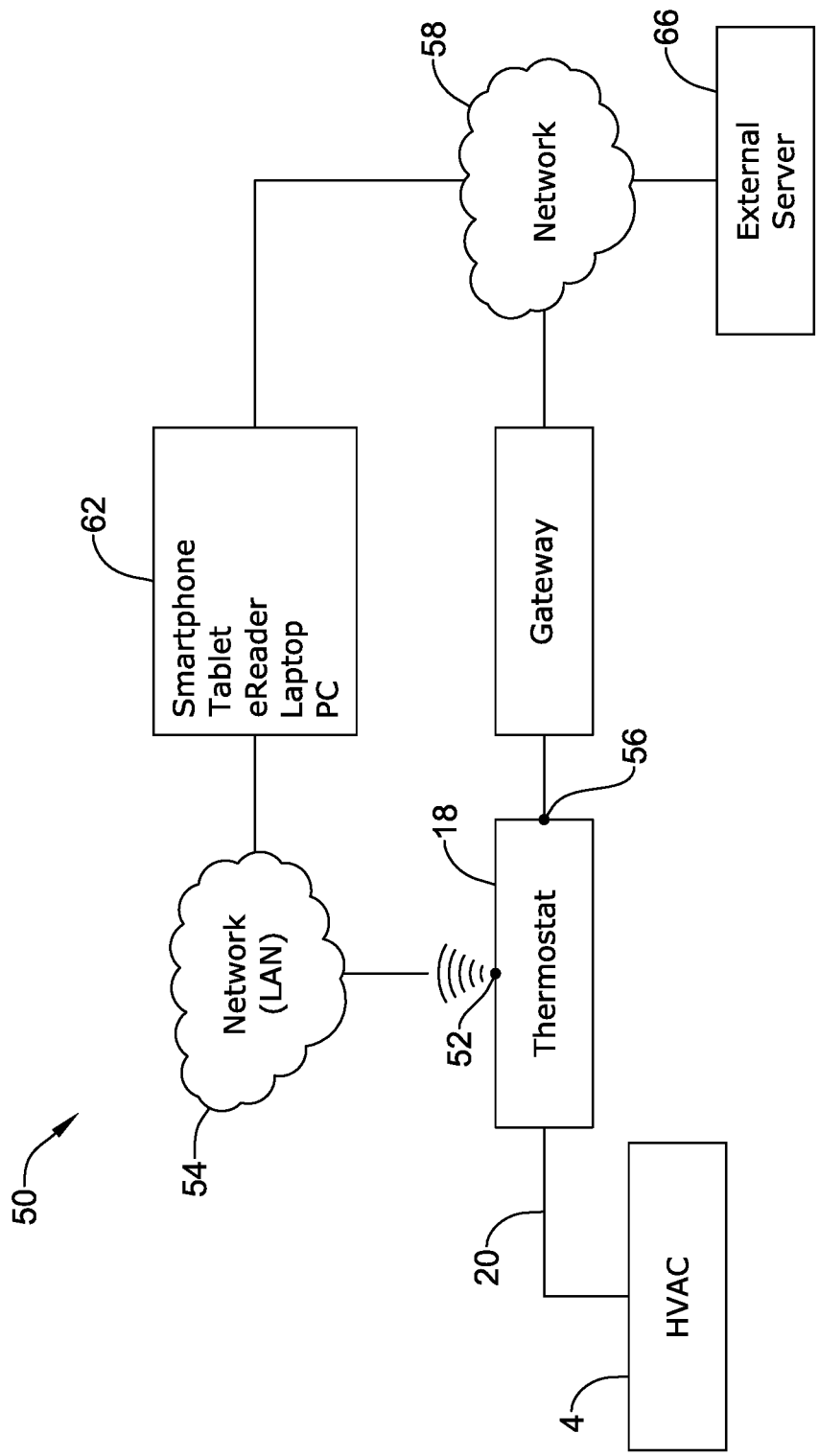
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
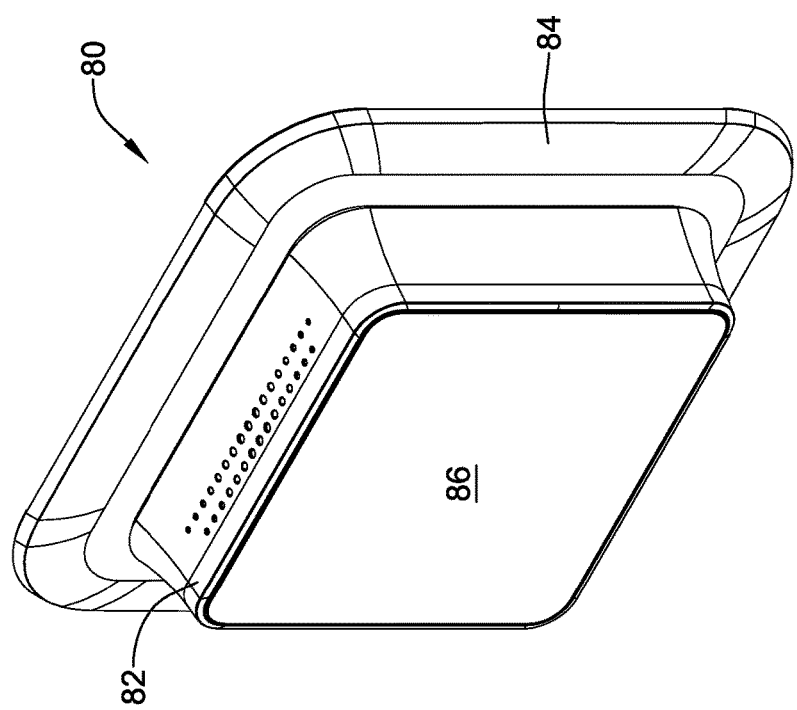
FIG. 3 is a perspective view of an illustrative thermostat assembly that may be used in the HVAC system of FIG. 1 or FIG. 2.

FIG. 3 is a perspective view of an illustrative thermostat assembly 80. In some instances, the thermostat assembly 80 may be considered as an example of the HVAC controller 18 referenced in FIGS. 1 and 2. In some instances, the thermostat assembly 80 may include a thermostat 82 and a trim piece 84. The thermostat 82 may include a user interface 86 which, in some cases, may be a touch screen display such as a fixed segment touch screen display or a dot matrix touch screen display. It will be appreciated that if the user interface 86 is a fixed segment touch screen display, the ability of the thermostat 82 to rearrange what is displayed on the user interface 86 may be somewhat limited. In some cases, it will be appreciated that a touch screen display may, for example, have any number of distinct touch points where the touch screen display is configured to sense that the touch point has been touched or is being touched. In some cases, the touch screen display may have a relatively limited number of distinct touch points in order to reduce costs, for example.

Figure 4:
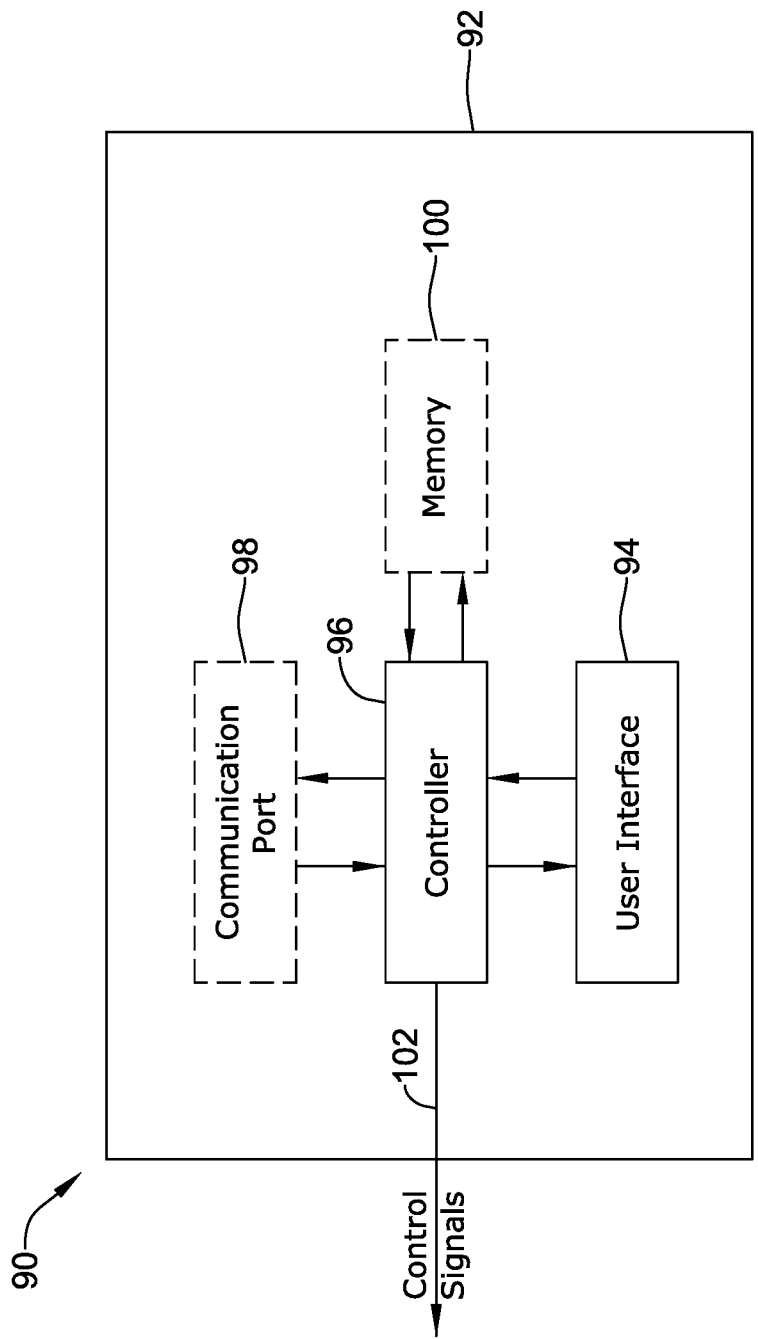
FIG. 4 is a schematic view of an illustrative HVAC controller that may, for example, form part of the HVAC system of FIG. 1 or FIG. 2.

FIG. 4 is a schematic view of an illustrative HVAC controller 90 that may, for example, be configured to control one or more HVAC components (such as but not limited to the HVAC component(s) 6 shown in FIG. 1 as part of the HVAC system 4). In some cases, the HVAC controller 90 may operate in accordance with a programmable schedule in which various time periods and/or days of the week have particular heating and/or cooling temperature setpoints, for example, although this is not required in all cases. It will be appreciated that the HVAC controller 90 may be utilized with any number of different HVAC systems, possibly having a variety of different HVAC components. In order for the HVAC controller 90 to correctly and efficiently operate the particular HVAC components installed at the installation site, it may be necessary to provide the HVAC controller 90 with one or more installation setup parameters. In some cases, the HVAC controller 90 may be configured to solicit installation setup parameters and potentially other information in a hierarchal or other manner in which the answer to a given query may tailor or alter subsequent queries. For example, if the HVAC controller 90 is told that the heat source is a forced air furnace, it will not ask questions pertaining to a hot water boiler.

In some cases, the HVAC controller 90 may include a housing 92. In some instances, the housing 92 may be considered as forming the outer structure of the thermostat 82 (FIG. 3), although this is not required in all cases. A user interface 94 may be disposed within the housing 92 in such a way as to be accessible from outside of the housing 92. In some cases, for example, the user interface 94 may form a portion of an outer surface, such as the front of the outer surface, of the housing 92. In some cases, the user interface 94 may be a touch screen display. In some instances, the user interface 94 may be a fixed segment touch screen display, and may for example have a limited number of distinct touch points. In some cases, the user interface 94 may be a dot matrix touch screen display, and in some cases essentially an entire surface of the user interface 94 may provide touch points.

The illustrative HVAC controller 90 includes a controller 96 that may be configured to operate an algorithm that at least partially controls the HVAC system of the building. In some cases, the algorithm references a plurality of equipment setup parameters that setup the algorithm for controlling the particular HVAC equipment that is used in the HVAC system of the particular building in which the HVAC controller 90 is installed. The user interface 94 is operably coupled to the controller 96. In some cases, the controller 96 may be configured to receive from a user, via the user interface 94, an indication of the geographic location of the HVAC system. In some cases, for example, the controller 96 may be configured to display on the user interface 94 an inquiry requesting entry by a user of an indication of the geographic location of the HVAC system.

In some cases, an indication of the geographic location of the HVAC system may include identifying a state or a county. In some instances, the indication of the geographic location of the HVAC system may include a zip code. In some cases, the indication of the geographic location of the HVAC system may include a street address. In some cases, the indication of the geographic location of the HVAC system may include a home telephone number, from which geographic location information may be looked up. These are just some examples.

As will be discussed, in certain geographic regions of the country, climate and available fuel types, for example, dictate that certain types of heating and/or cooling systems are relatively more common. Accordingly, by telling the HVAC controller 90 an indication of a geographic location of the particular installation, the HVAC controller 90 may tailor a series of inquiries in a logical manner, and can exclude or subordinate inquiries that do not make as much sense given previous responses. In some cases, the HVAC controller 90 may be able to prioritize possible responses to a particular inquiry. For example, the 3 or 4 most expected responses may be listed in a bullet fashion for easy selection by the user, while less expected (but still possible) responses may be listed below in a pull down menu. In some cases, the HVAC controller 90 may identify and display at least one likely parameter value for one or more of the plurality of equipment setup parameters based at least in part on the received indication of the geographic location of the HVAC system. In some cases, the at least one likely parameter value includes an ordered list of two or more most likely parameter values for each of one or more of the equipment setup parameters. The controller 96 may receive a selection of a desired parameter value for one or more of the plurality of equipment setup parameters and may then operate the algorithm referencing the desired parameter value to at least partially control the HVAC system of the building. In some cases, the controller 96 may output one or more control signals 102 that are provided to the HVAC system.

In one example, the controller 96 may be configured to receive from a user, via the user interface 94, an indication of a type of the building in which the HVAC equipment is installed. For example, this may mean asking the user if the building is a single family home or a multi-family building (e.g. apartment building). In another example, this may mean asking the user if the building is a single level home or a multiple level home, and perhaps the number of square feet, as some multiple level homes have more than one heat source, particularly if the home is relatively large. In some cases, the controller 96 may be configured to identify and display at least one likely parameter value for one or more of the plurality of equipment setup parameters based at least in part on the received indication of the geographic location of the HVAC system and the received indication of the type of the building.

In some instances, the controller 96 may be configured to receive from a user via the user interface 94 an indication of an HVAC system type. Illustrative but non-limiting examples of HVAC system types include forced air systems, hot water systems such as hot water radiators and hot water baseboard systems, steam radiators and in-floor systems such as in-floor electrical heating and in-floor hot water heating. In some cases, the controller 96 may be configured to receive from a user via the user interface 94 an indication of an HVAC fuel type. Illustrative but non-limiting examples of possible HVAC fuel types include electricity, natural gas, propane, fuel oil, wood and biomass materials. In some cases, the controller 96 may be configured to receive from a user via the user interface 94 an indication of a brand of the HVAC system and/or a brand of the different HVAC components. In some cases, the controller 96 may be configured to receive from a user via the user interface 94 an indication of which thermostat wires are connected to the HVAC controller 90 (e.g. by color). In some cases, particular combinations of thermostat wires that are connected to the HVAC controller 90 may give the HVAC controller 90 some information as to the identity of at least some of the HVAC components that are to be controlled by the HVAC controller 90.

In some instances, the controller 96 may be configured to utilize the information pertaining to geographic location to determine ranked parameter values for at least some of the equipment setup parameters and to display the ranked parameter values on the user interface 94 for selection by the user. In some cases, the controller 96 may also be configured to reconcile the geographic location with climate zone data in determining the ranked parameter values for at least some of the equipment setup parameters. In some cases, the controller 96 may also be configured to reconcile the geographic location with temperature and/or humidity zones in determining the ranked parameter values for at least some of the equipment setup parameters. In some instances, the controller 96 may also be configured to reconcile the geographic location with data describing dominant heating fuels by region in determining the ranked parameter values for at least some of the equipment setup parameters. In some cases, the controller 96 may be configured to display a list of possible wire types so that a user can indicate which wires are currently being used, and an order in which the possible wire type are listed is based at least in part upon the provided geographical location and/or at least some of the solicited additional information.

In some cases, as illustrated, the HVAC controller 90 may include a communication port 98 that is operably coupled to the controller 96 and that is configured to provide access to a remote server. In some cases, the remote server may provide the controller 96 with data correlating geographic location with likely parameter values for one or more of the plurality of equipment setup parameters. In some instances, the HVAC controller 90 may additionally or alternatively include a memory 100 that is operably coupled to the controller 96. In some cases, the memory 100 may be configured to provide the HVAC controller 90 with data correlating geographic location with likely parameter values for one or more of the plurality of equipment setup parameters.

Figure 5:
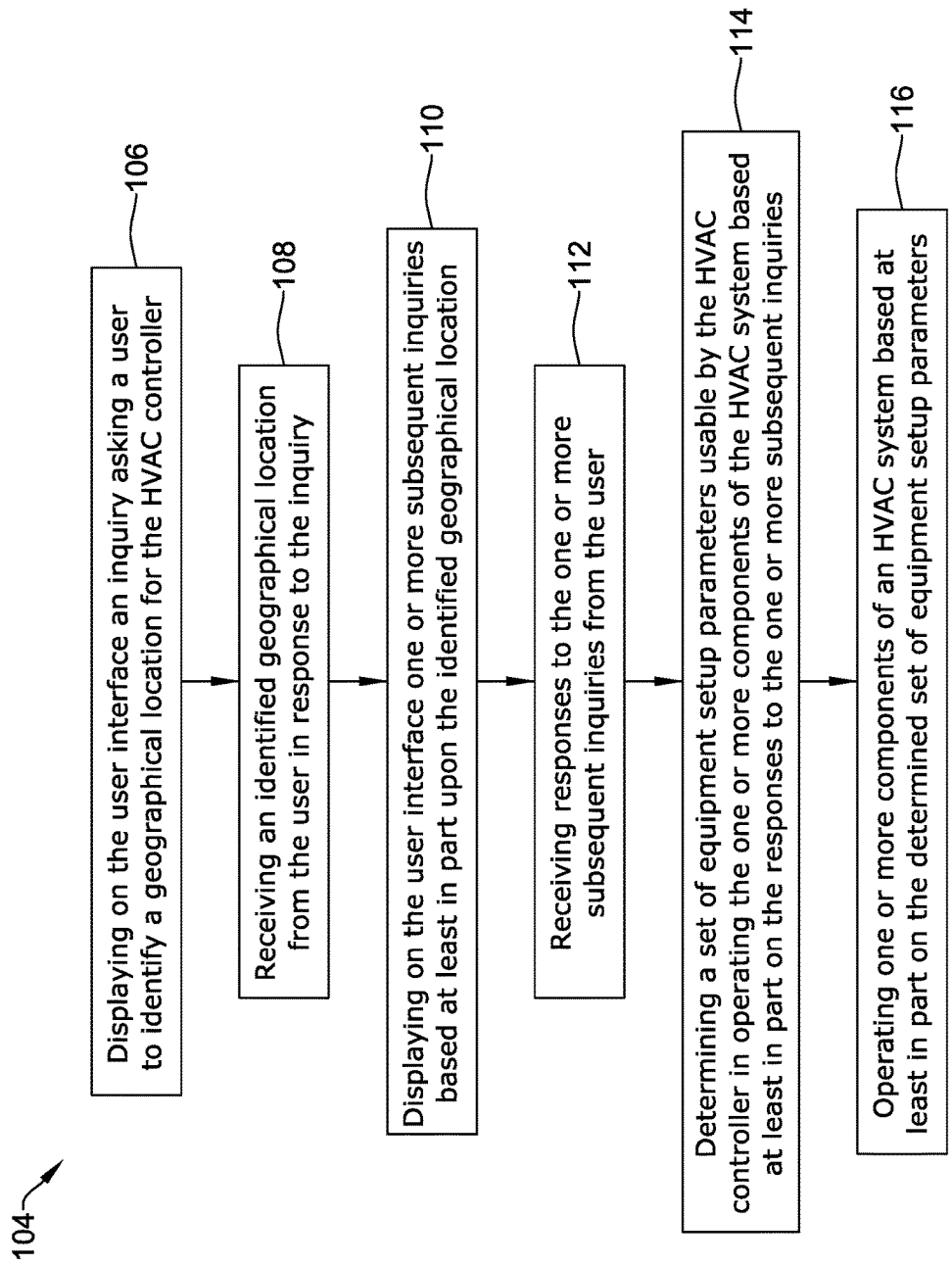
FIG. 5 is a flow diagram showing an illustrative method that may be carried out, for example, using an HVAC controller such as the HVAC controller of FIG. 4.

FIG. 5 is a flow diagram showing an illustrative but non-limiting example of a method 104 for configuring an HVAC controller (such as but not limited to the HVAC controller 90 of FIG. 4) that includes a controller that is operably coupled to a user interface. As generally indicated at block 106, an inquiry asking a user to identify a geographical location for the HVAC controller may be displayed on the user interface. An identified geographical location may be received from the user in response to the inquiry as seen at block 108. One or more subsequent inquiries based at least in part upon the identified geographical location may be displayed on the user interface as indicated at block 110.

In some cases, one of the subsequent inquiries referenced at block 110 may include a listing of HVAC system types that are most likely for the identified geographical location for selection by the user. In some cases, one of the subsequent inquiries referenced at block 110 may include a listing of HVAC fuel types that are most likely for the identified geographical location for selection by the user. In some instances, one of the subsequent inquiries referenced at block 110 may include a listing of HVAC controller brands that are most likely for the identified geographical location for selection by the user. In some cases, one of the subsequent inquiries referenced at block 110 may include a list of possible wire types so that a user can indicate which wires are currently being used, and an order in which the possible wire type are listed is based at least in part upon the provided geographical location and answers to at least some of the subsequent inquires.

At block 112, responses to the one or more subsequent inquiries from the user may be received. As generally indicated at block 114, a set of equipment setup parameters usable by the HVAC controller in operating the one or more components of the HVAC system may be determined based at least in part on the responses to the one or more subsequent inquiries. One or more components of an HVAC system may be operated based at least in part on the determined set of equipment setup parameters.

Figure 6:
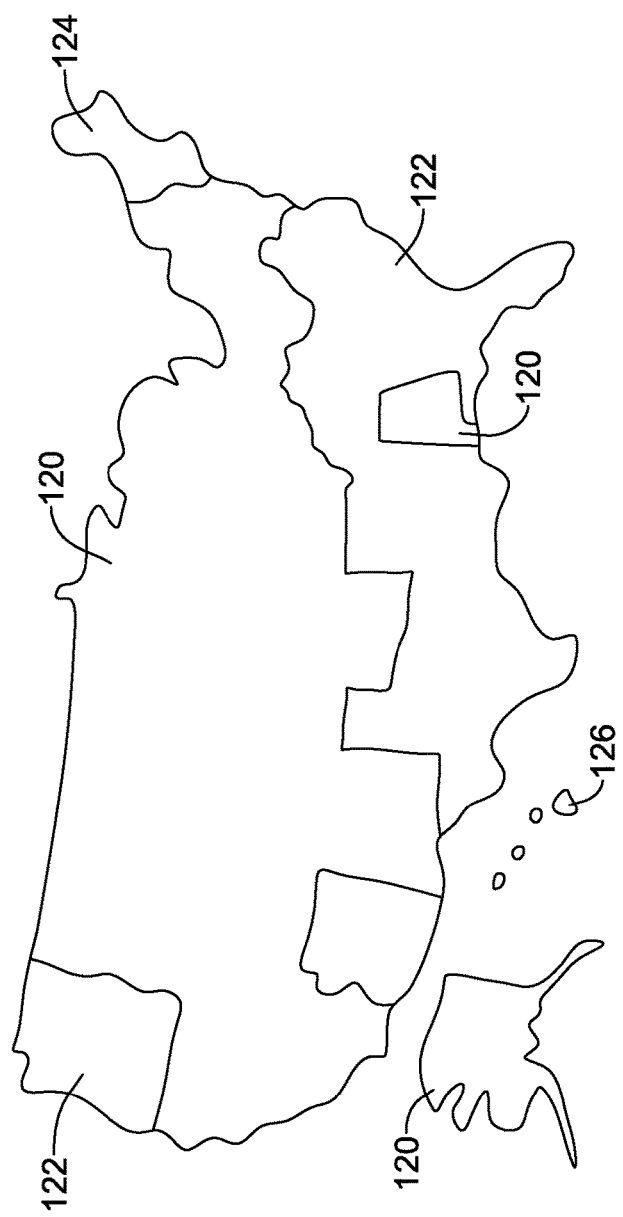
FIG. 6 is a schematic illustration of predominant heating fuel sources in the United States.
Figure 7:
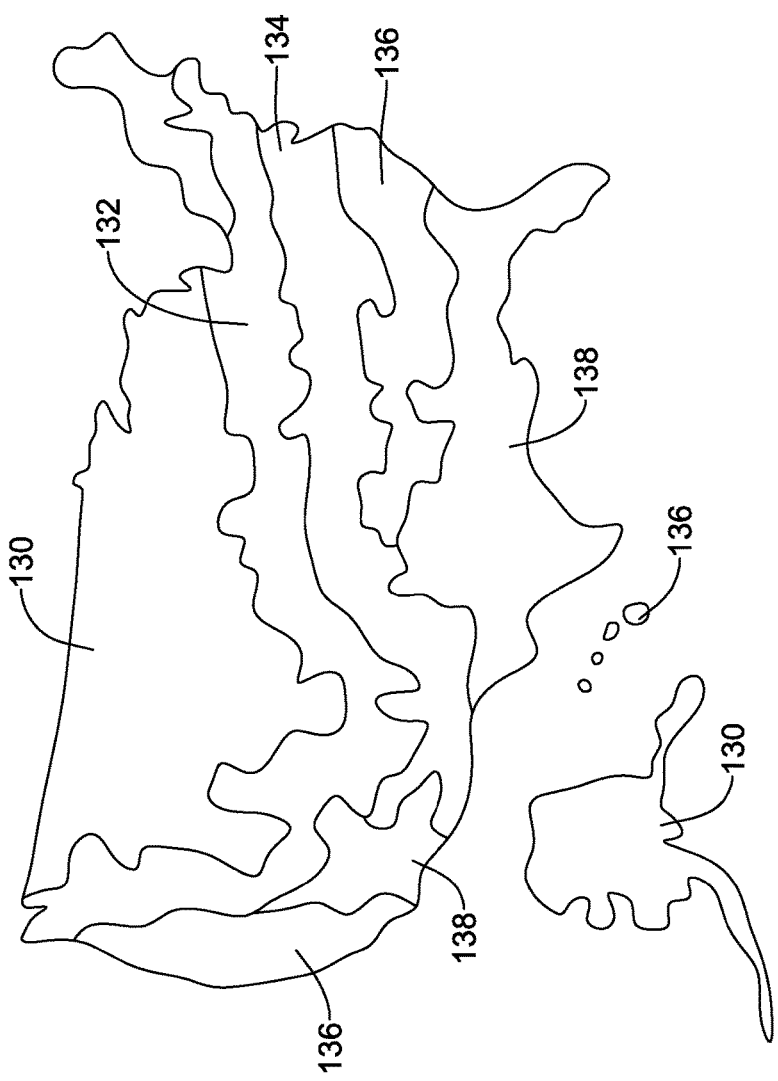
FIG. 7 is a schematic illustration of climate data in the United States.
Figure 8:
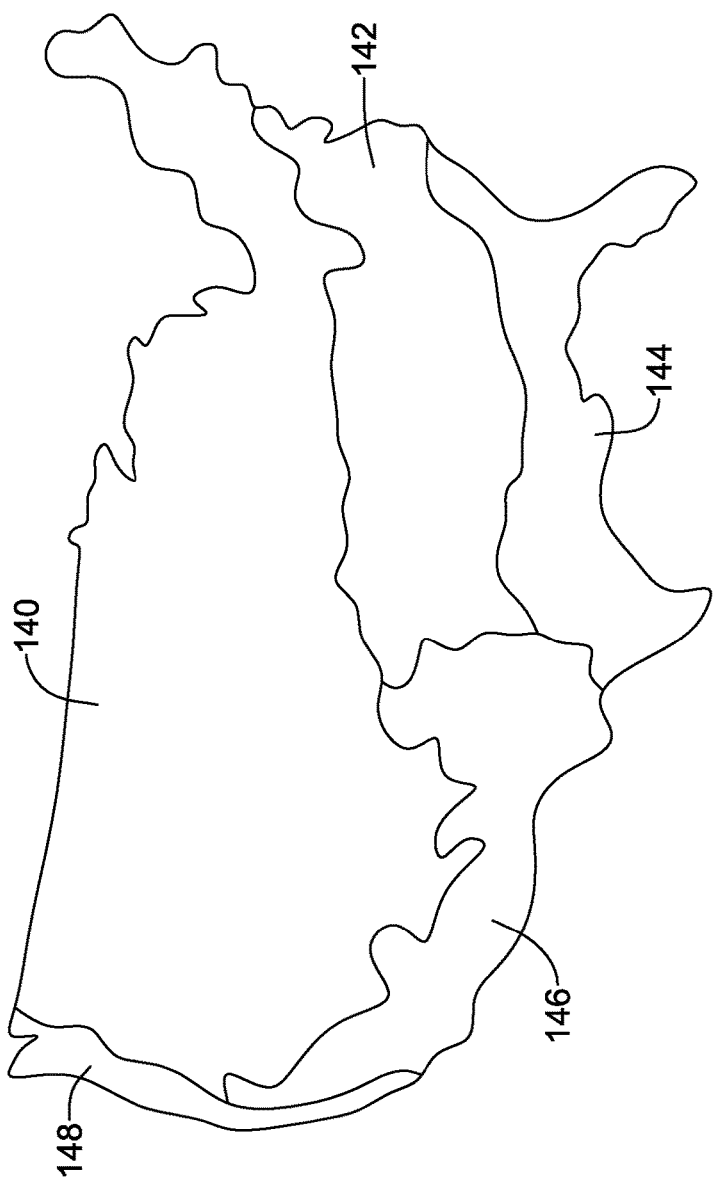
FIG. 8 is a schematic illustration of temperature and humidity data in the United States.

In some cases, as noted, information pertaining to geographic location can be helpful in making intelligent assumptions regarding most common heating and cooling systems, preferred fuel types, and the like. A large amount of data, including census data, is commercially available and can be used in tying geographic location to a variety of HVAC-related parameters. Private databases may also be references. Manufacturers may have databases that indicate the types of HVAC equipment sold and/or serviced in various geographic regions. FIGS. 6, 7 and 8 provide a small sampling of some available data.

FIG. 6 provides a schematic illustration of the United States, roughly showing which fuels are most commonly used for heating. This particular illustration shows fuel usage in 2010. In a region 120, which is a large fraction of the northern United States, including Alaska and one southern state, Alabama, natural gas is the most used fuel for heating. In a region 122, which is a large fraction of the southern United States, as well as Washington and Oregon, electricity is the most used fuel for heating. In a region 124, which corresponds to several northern Atlantic states, heating oil and/or kerosene is the most used fuel for heating. In a region 126, which corresponds to the Hawaiian islands, there is no dominant heating fuel.

FIG. 7 provides a schematic illustration of the United States, roughly showing climate data in various parts of the country. In some cases, as illustrated, climate data may be expressed in terms of Cooling-Degree-Days (CDD) and Heating-Degree-Days (HDD). CDD and HDD are generally expressed relative to some sort of reference temperature. One CDD (or one HDD) would indicate a need to cool (or heat) a difference of one degree for one day. Zone 1 is indicated by reference number 130, and generally indicates less than 2,000 CDD per year and more than 7,000 HDD per year. Zone 2, which is indicated by reference number 132, generally indicates less than 2,000 CDD per year and 5,500 to 7,000 HDD per year. Zone 3, indicated by reference number 134, generally indicates less than 2,000 CDD per year and 4,000 to 5,499 HDD per year. Zone 4, indicated by reference number 136, generally indicates less than 2,000 CDD per year and less than 4,000 HDD per year. Finally, Zone 5, indicated by reference number 138, generally indicates 2,000 CDD or more each year, and less than 4,000 HDD per year.

FIG. 8 provides a schematic illustration of the United States, roughly showing temperature and humidity data for various parts of the country. It will be appreciated that in some cases, considering temperature and humidity in combination may be useful. A region 140 may generally be considered as being cold or very cold. A region 142 may be considered as being mixed in temperature but humid. A region 144 may be considered as hot and humid. A region 146 may be considered as hot in temperature and dry or mixed in humidity. A region 148 may be considered as being a marine environment. The charts shown in FIGS. 6-8 are intended to be illustrative only, and provide some examples of the types of data that might be used.

FIGS. 9A through 9D provide, in combination, a flow diagram showing an illustrative but non-limiting method 150 of configuring an HVAC controller. In some ways, it will be appreciated that the method 150 shown herein may be considered as representing an interaction between the HVAC controller 90 and the user, with the HVAC controller 90 displaying a series of inquiries and the user providing a corresponding series of responses. The method 150 begins at decision block 152, where there is a query as to whether the user is a professional installer. If yes, control passes to block 154 and the method terminates. If no, control passes to block 156 and the user is asked to enter the geographic information. In some cases, as illustrated, the user is asked to enter their zip code. Control then passes to decision block 158, where the user is asked if they live in a single family residence or a multi-family residence. If the user indicates that they live in a multi-family residence, control passes to block 160 where the user is asked to indicate if they have their own HVAC system (in their unit) or if they are in a building with a central HVAC unit, and then passes to block 162. If the user indicated that they live in a single family residence, block 160 is skipped and control passes to block 162. At block 162, the user is asked to select their HVAC functions, i.e., heating, cooling or both. At block 164, the user is asked to select how many thermostats they have, i.e., one, two, etc. Connector 166 ties the method 150 to FIG. 9B.

Figure 9A:
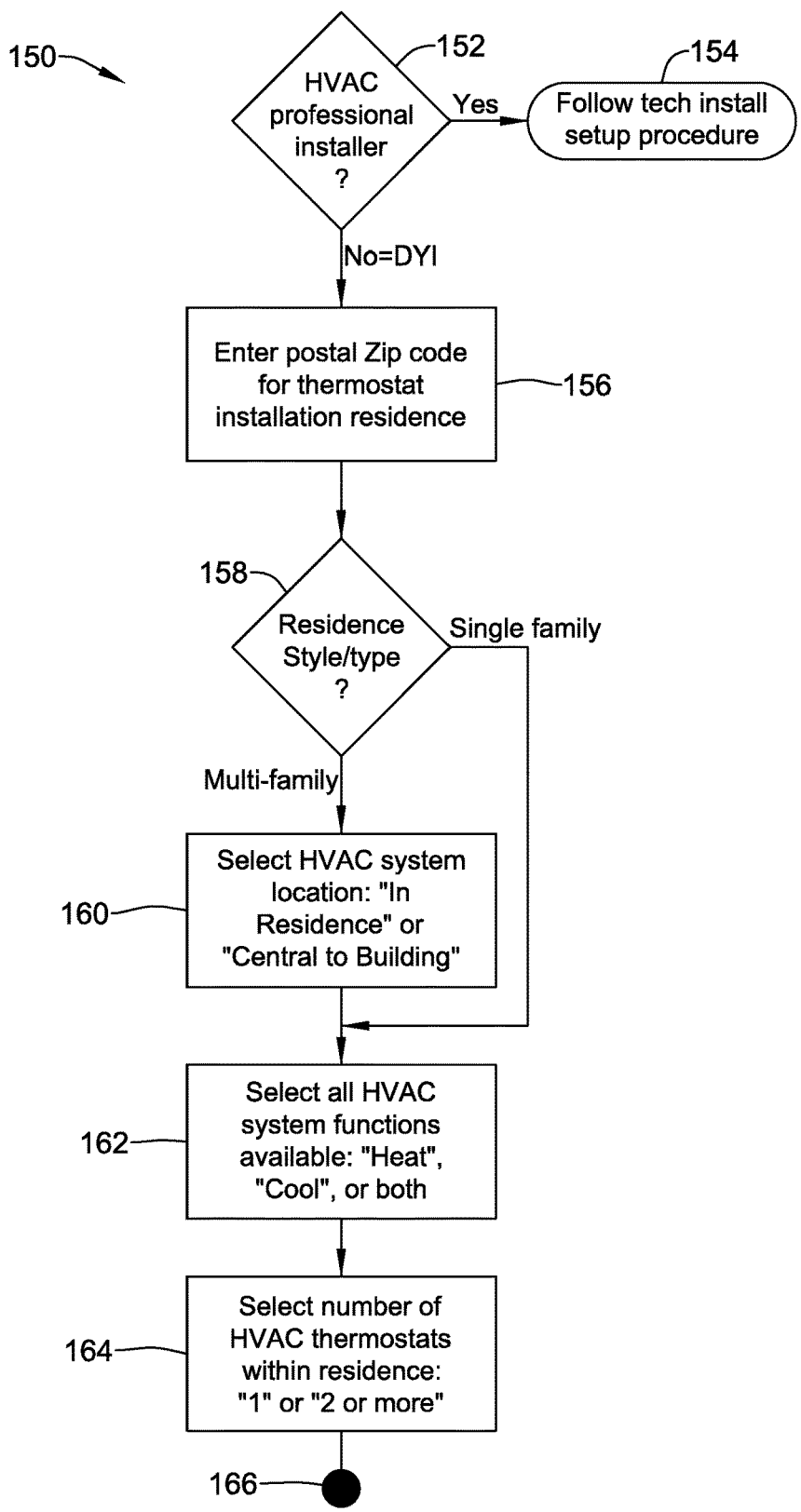
FIGS. 9A through 9D in combination provide a flow diagram of an illustrative method that may be carried out in configuring an HVAC controller such as the HVAC controller of FIG. 4.
Figure 9B:
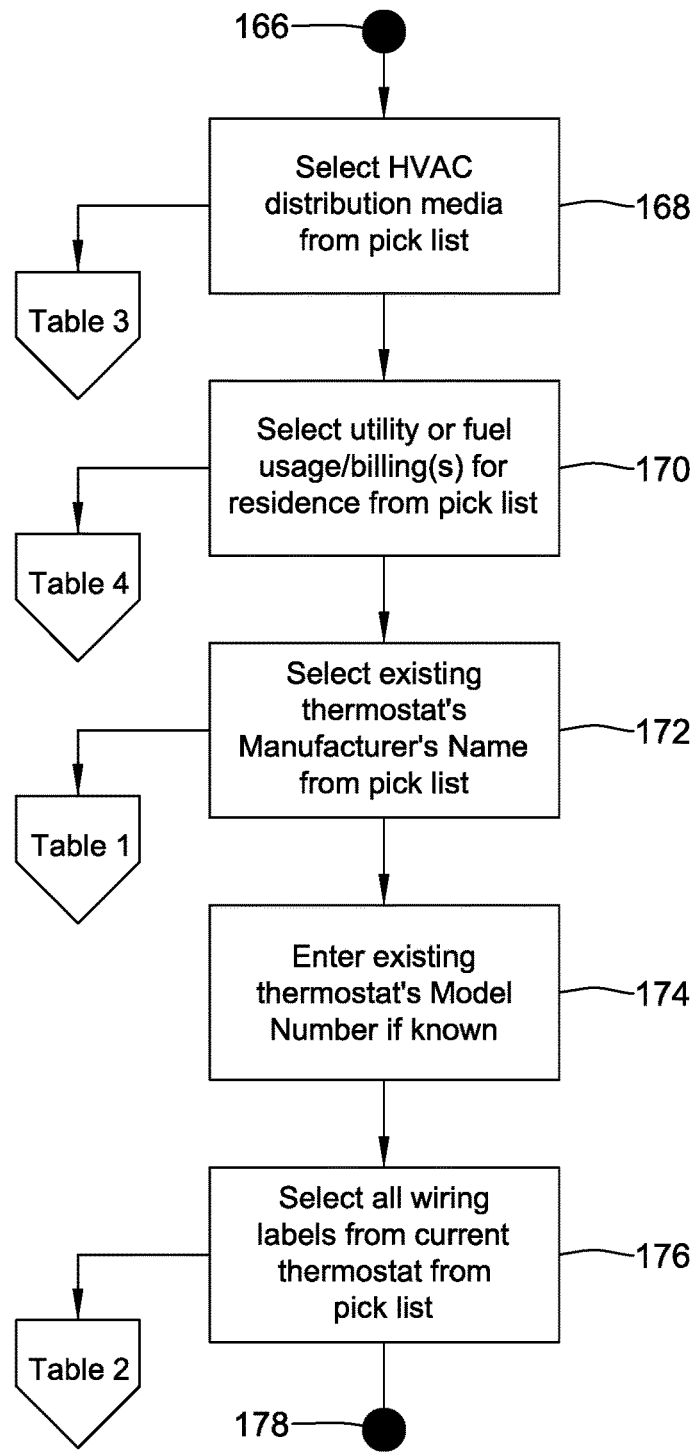
Figure 10:
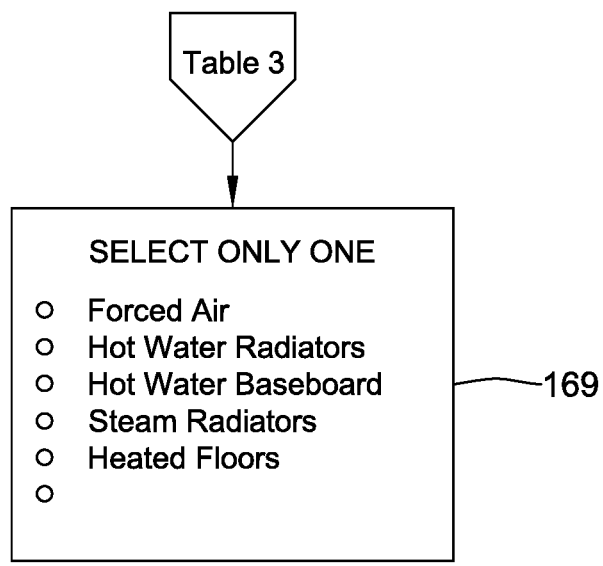
FIG. 10 provides a listing of HVAC distribution media as referenced in the method shown in FIGS. 9A through 9D.
Figure 11:
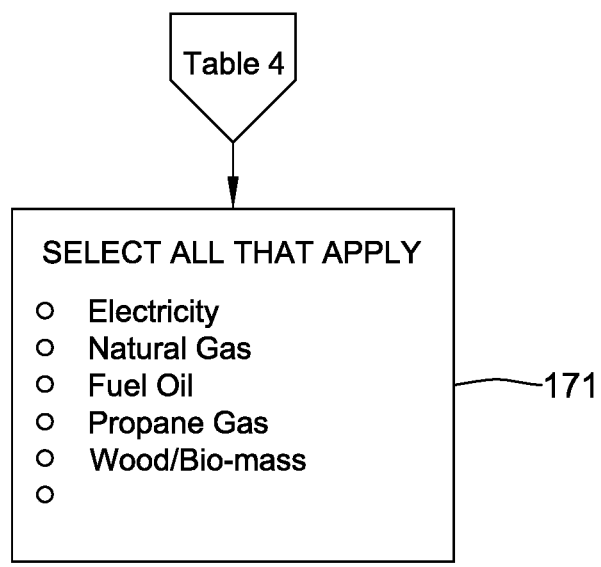
FIG. 11 provides a listing of fuel types as referenced in the method shown in FIGS. 9A through 9D.

In FIG. 9B, starting at connector 166, the user is asked at block 168 to select their HVAC distribution media from a pick list. Table 3, shown in FIG. 10, provides a bullet list 169 of HVAC distribution media. The list may be ordered to display the most likely HVAC distribution media at the top based at least in part on the designed geographic region. In some cases, Table 3 may be displayed on a display of the HVAC controller 90 such that the user is able to click one or otherwise select one of the listed choices. Returning to FIG. 9B, control passes to block 170, where the user is asked to select their fuel type. Table 4, shown in FIG. 11, provides a bullet list 171 of fuel types. The list may be ordered to display the most likely fuel types at the top based at least in part on the designed geographic region. In some cases, Table 4 may be displayed on a display of the HVAC controller 90 such that the user is able to click or otherwise select one of the listed choices. Returning again to FIG. 9B, control passes to block 172, where the user is asked to select the manufacturer of their thermostat from a pick list. Table 1, shown in FIG. 12, provides a bullet list of manufacturers. The list may be ordered to display the most likely manufacturer at the top based at least in part on the designed geographic region. In some cases, FIG. 12 provides a list 173 of the most common manufacturers. If the user does not see theirs, the user can select a pull down menu 175, which will provide an expanded list 177 for the user to choose from. In some cases, Table 1 may be displayed on a display of the HVAC controller 90 such that the user is able to click or otherwise select one of the listed choices. Returning again to FIG. 9B, at block 174 the user is asked to enter their thermostat's model number, if known. In some cases, only the model numbers of the selected manufacturer may be displayed.

Figure 13A:
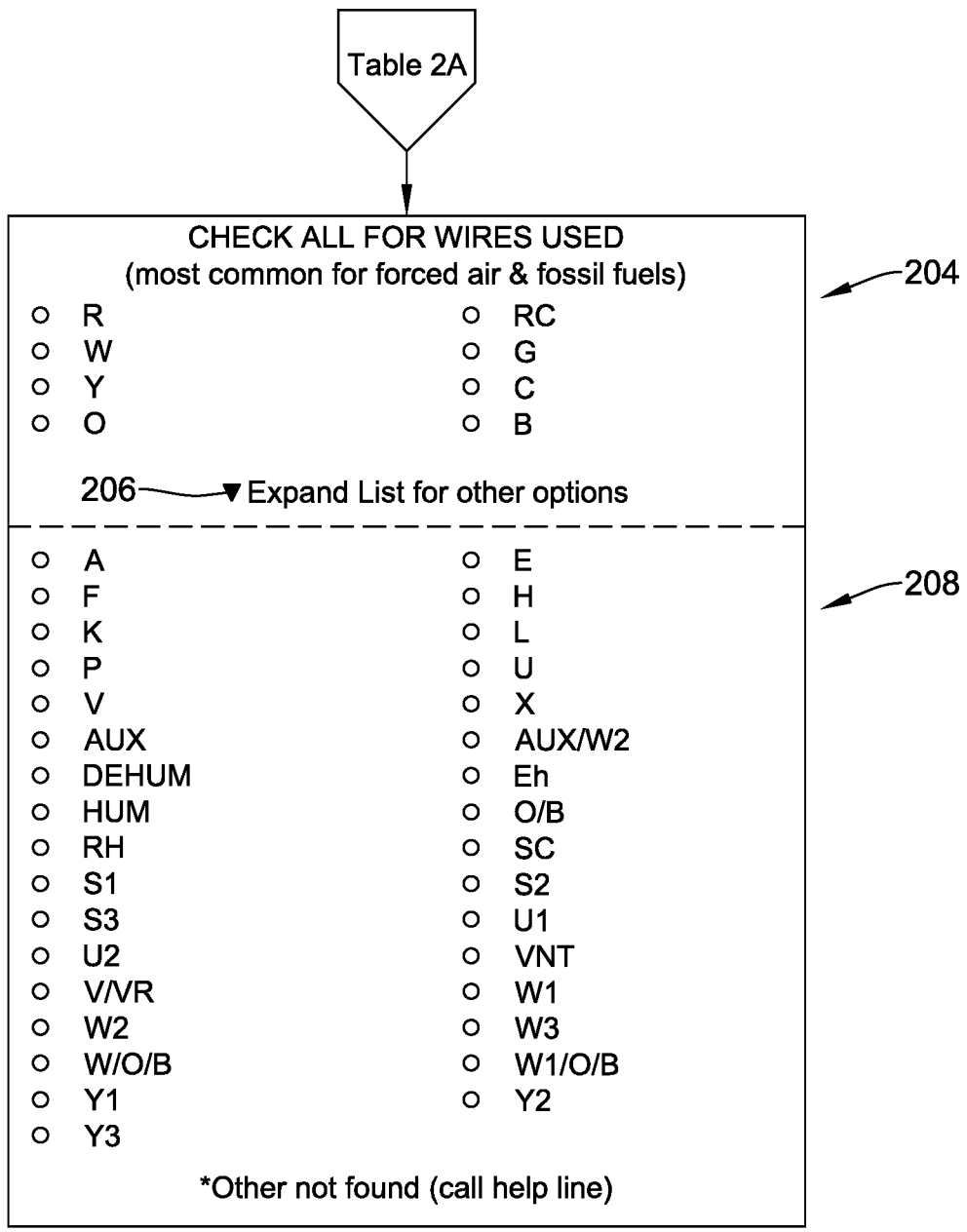
FIGS. 13A through 13C provide listings of possible wire combinations as referenced in the method shown in FIGS. 9A through 9D.
Figure 13B:
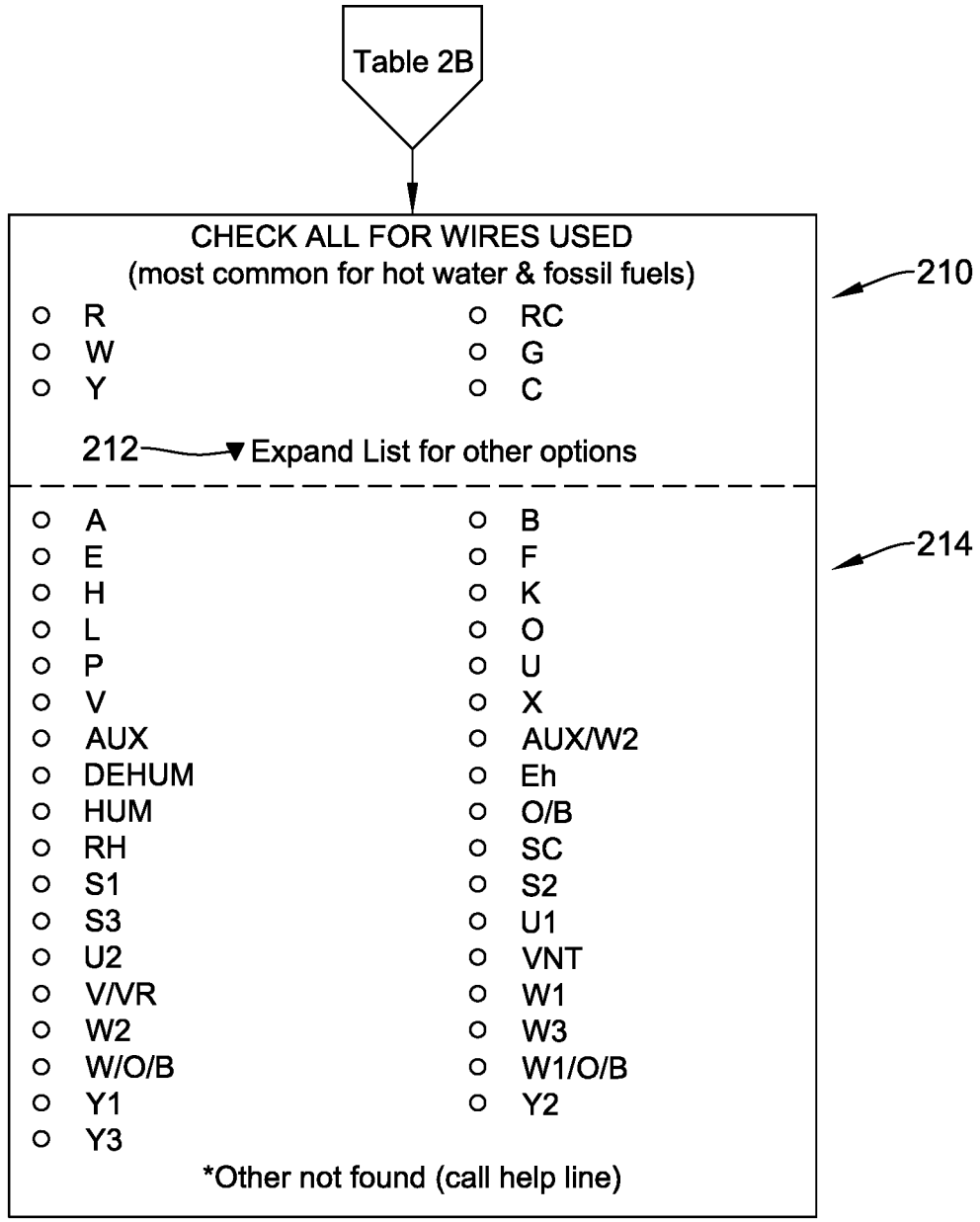
Figure 13C:
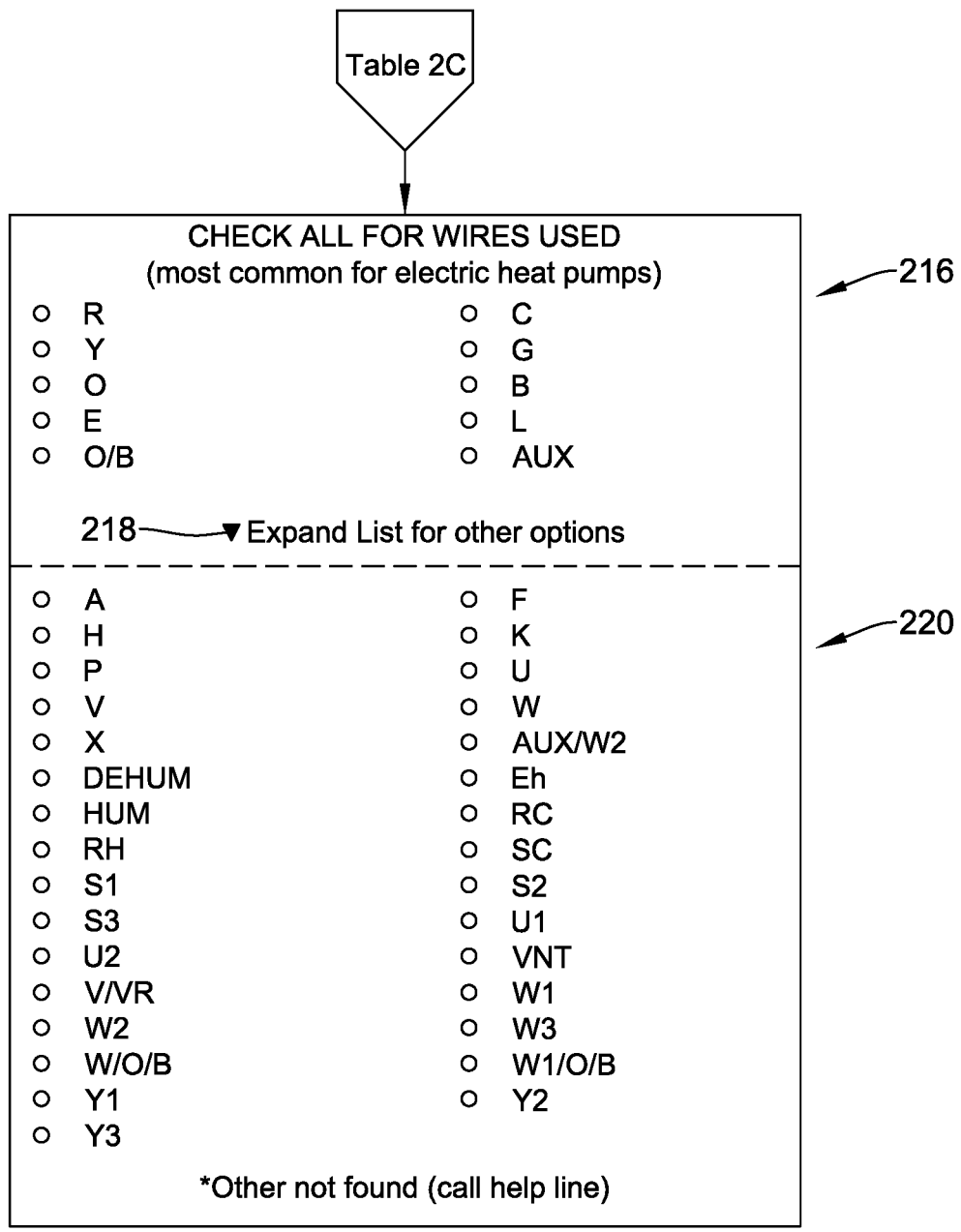

At block 176, the user is asked to indicate which thermostat wires are currently connected. Table 2, which is broken out into Table 2A (FIG. 13A), Table 2B (FIG. 13B) and Table 3C (FIG. 13c), provides lists of wires to select from. It will be appreciated that while each of FIGS. 13A through 13C list, for the most part, all possible thermostat wire labels for possible selection, the order of how the wire labels are listed is varied. For example, FIG. 13A shows a list 204 of the most common wires for HVAC systems that include a forced air system and that burn fossil fuels (oil, natural gas). Accordingly, and in some cases, the user is only presented the most likely wire choices based on their previous selections. If the user happens to have additional or different wires, the user can select a pull down menu 206, which provides an expanded list 208 that the user can choose from. FIG. 13B shows a list 210 of the most common wires for HVAC systems that combine hot water and the use of fossil fuels. If the user happens to have additional or different wires, the user can select a pull down menu 212, which will provide an expanded list 214 that the user can choose from. FIG. 13C shows a list 216 of the most common wires for HVAC system that include electric heat pumps. If the user happens to have additional wires, the user can select a pull down menu 218, which will provide an expanded list 220 that the user can choose from. In some cases, the HVAC controller will display the appropriate table from FIGS. 13A, 13B and 13C based on previously received responses from the user. In some cases, knowing both the thermostat model (as referenced at block 174) and the connected wires can provide more accurate information than either alone. Returning to FIG. 9B, connector 178 ties the method 150 to FIG. 9C.

Figure 9C:
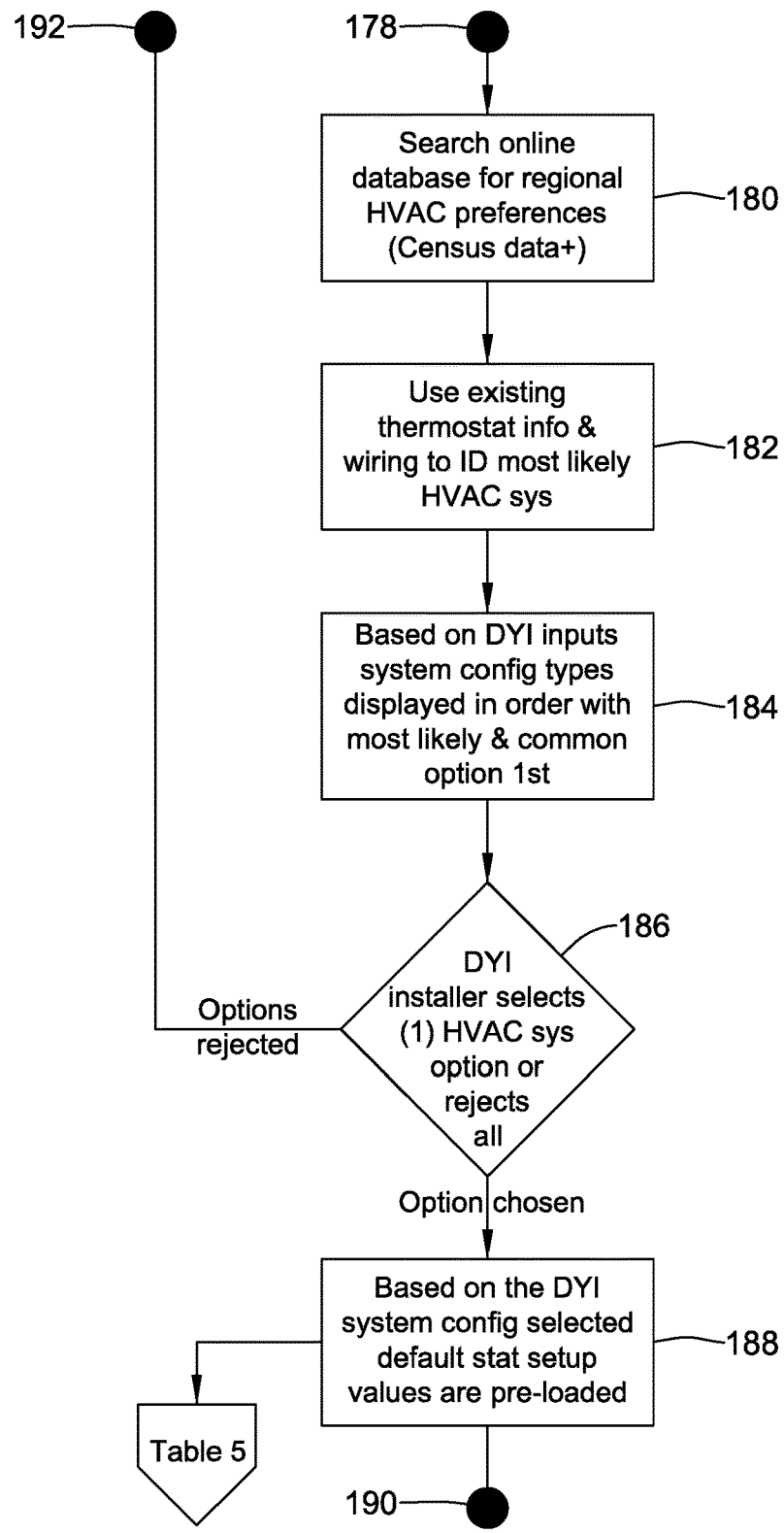

In FIG. 9C, beginning at connector 178, control passes to block 180 where online resources may be searched for regional HVAC preferences. FIGS. 6, 7 and 8, previously discussed, may be considered as examples of the types of data that may be found online, or stored in a server such as the external server 66 (FIG. 2). In some cases, the data may be stored locally in the memory 100 of the HVAC controller 90. At block 182, existing thermostat information and wiring may be used by the HVAC controller (or a remote server in communication with the HVAC controller) to identify the most likely HVAC setup parameters. At block 184, the most likely HVAC setup parameters are displayed for selection or rejection by the user. At decision block 186, the user is able to select or reject the displayed configuration. If rejected, control passes to connector 192. If accepted, control passes to block 188 and the selected default configuration is loaded. Table 5, which is broken out into Table 5A (FIG. 14A), Table 5B (FIG. 14B) and Table 5C (FIG. 14c), shows several default configurations. FIG. 14A shows a list of parameter settings for a domestic forced air system burning fossil fuels. FIG. 14B shows a list of parameter settings for a Canadian hot water system burning fossil fuels. FIG. 14C shows a list of parameter settings for a domestic electric heat pump system. It will be appreciated that these listings are illustrative only. Connector 190 ties the method to FIG. 9D.

Figure 9D:
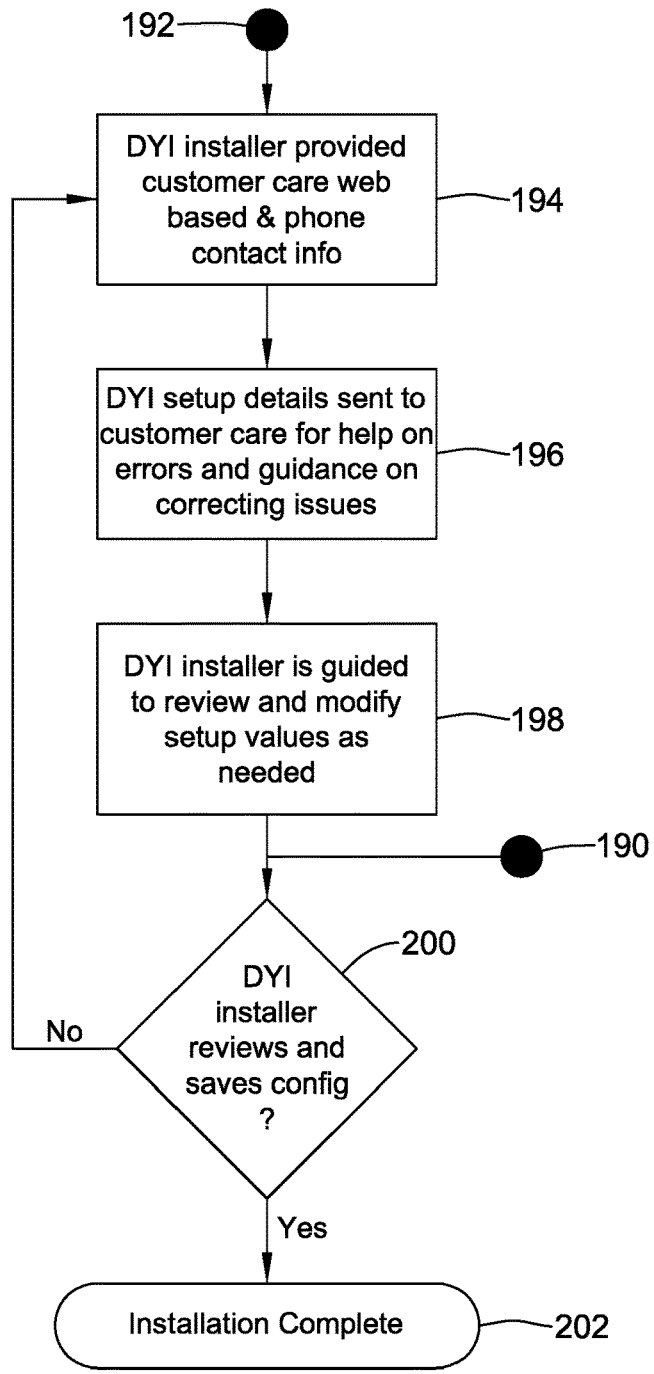

In FIG. 9D, beginning at connector 192 (if decision block 186 yielded a rejection), control passes to block 194 where the user is given website and/or telephone contact info for obtaining professional assistance. In some cases, and as shown at block 196, information that was entered by the user is sent to a remote server to facilitate the user obtaining help. At block 198, the user is guided back through the installation to make any necessary corrections to what the user had selected or otherwise entered previously on their own. Control passes to decision block 200, where the user is able to review and save the configuration. If the user had previously accepted the setup referenced in decision block 186, control passes via connector 190 to decision block 200. If the user accepts and saves the configuration at decision block 200, control passes to block 202 and the installation is complete. If not, control reverts to block 194 where the user is again given contact information for obtaining help.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. An HVAC controller configured to control at least part of an HVAC system of a building, the HVAC controller comprising:

a controller configured to operate an algorithm that at least partially controls the HVAC system of the building, the algorithm referencing a plurality of equipment setup parameters that setup the algorithm for controlling the particular HVAC equipment that is used in the HVAC system of the building;

a user interface operably coupled to the controller;

the controller configured to receive from a user via the user interface an indication of a geographic location of the HVAC system;

the controller configured to identify and display a list of two or more possible parameter values for one of the plurality of equipment setup parameters, wherein the controller is configured to determine an ordering of the two or more possible parameter values within the list based at least in part on the received indication of the geographic location of the HVAC system;

the controller configured to receive a selection of a desired parameter value for the one of the plurality of equipment setup parameters; and the controller is configured to operate the algorithm referencing the desired parameter value to at least partially control the HVAC system of the building.

2. The HVAC controller of claim 1, wherein:

the controller is configured to receive from the user via the user interface an indication of a type of the building; and the controller is configured to determine the ordering of the two or more possible parameter values within the list based at least in part on the received indication of the geographic location of the HVAC system and the received indication of the type of the building.

3. The HVAC controller of claim 1, wherein the controller is configured to display on the user interface an inquiry requesting entry of the indication of the geographic location of the HVAC system.

4. The HVAC controller of claim 1, further comprising a communication port operably coupled to the controller and configured to provide access to a remote server, the remote server configured to provide the controller with data correlating geographic locations with likely parameter values for the one of the plurality of equipment setup parameters, and wherein the controller is configured to determine the ordering of the two or more possible parameter values within the list based at least in part on the received indication of the geographic location of the HVAC system and the data correlating the geographic locations with the likely parameter values for the one of the plurality of equipment setup parameters.

5. The HVAC controller of claim 1, further comprising a memory operably coupled to the controller, the memory configured to provide the controller with data correlating geographic locations with likely parameter values for the one of the plurality of equipment setup parameters, and
wherein the controller is configured to determine the ordering of the two or more possible parameter values within the list based at least in part on the received indication of the geographic location of the HVAC system and the data correlating the geographic locations with the likely parameter values for the one of the plurality of equipment setup parameters.

6. The HVAC controller of claim 1, wherein the one of the plurality of equipment setup parameters comprises an HVAC system type parameter, wherein the controller is configured to determine an ordering for two or more possible HVAC system type parameter values within a list of two or more possible HVAC system type parameter values based at least in part on the received indication of the geographic location of the HVAC system, display the list of two or more possible HVAC system type parameter values, and receive via the user interface an indication of an HVAC system type from the list of two or more possible HVAC system type parameter values.

7. The HVAC controller of claim 1, wherein the one of the plurality of equipment setup parameters comprises an HVAC fuel type parameter, wherein the controller is configured to determine an ordering for two or more possible HVAC fuel type parameter values within a list of two or more possible HVAC fuel type parameter values based at least in part on the received indication of the geographic location of the HVAC system, display the list of two or more possible HVAC fuel type parameter values, and receive via the user interface an indication of an HVAC fuel type from the list of two or more possible HVAC fuel type parameter values.

8. The HVAC controller of claim 1, wherein the one of the plurality of equipment setup parameters comprises a brand or a model number parameter, wherein the controller is configured to determine an ordering for two or more possible HVAC brand or model number parameter values within a list of two or more possible HVAC brand or model number parameter values based at least in part on the received indication of the geographic location of the HVAC system, display the list of two or more possible HVAC brand or model number parameter values, and receive via the user interface an indication of a brand and/or a model number of the HVAC system from the list of two or more possible HVAC brand or model number parameter values.

9. The HVAC controller of claim 1, wherein the one of the plurality of equipment setup parameters comprises an indication of thermostat wires that are connected to the HVAC controller, wherein the controller is configured to determine an ordering for two or more possible thermostat wires that are connected to the HVAC controller within a list of two or more possible thermostat wires that are connected to the HVAC controller based at least in part on the received indication of the geographic location of the HVAC system, display the list of two or more possible thermostat wires that are connected to the HVAC controller, and receive via the user interface an indication of which thermostat wires are connected to the HVAC controller from the list of two or more possible thermostat wires that are connected to the HVAC controller.

10. An HVAC controller configured to control at least part of an HVAC system for a building, the HVAC controller comprising:
a controller configured to operate an algorithm that at least partially controls the HVAC system of the building, the algorithm referencing a plurality of equipment setup parameters that setup the algorithm for controlling the particular HVAC equipment that is used in the HVAC system of the building;
a display screen operably coupled to the controller;
the controller configured to display on the display screen an inquiry asking a user to provide a geographical location for the building; and
the controller further configured to utilize the geographical location for the building to determine two or more ranked parameter values for at least some of the equipment setup parameters and to display the determined two or more ranked parameter values on the display screen for selection by the user, wherein the two or more ranked parameter values comprise possible parameter values for one of the plurality of equipment setup parameters.

11. The HVAC controller of claim 10, wherein the controller is further configured to reconcile the geographical location with climate zone data in determining the ranked parameter values for at least some of the equipment setup parameters.

12. The HVAC controller of claim 10, wherein the controller is further configured to reconcile the geographical location with one or both of temperature zones and humidity zones in determining the ranked parameter values for at least some of the equipment setup parameters.

13. The HVAC controller of claim 10, wherein the controller is further configured to reconcile the geographical location with data describing dominant heating fuels by region in determining the ranked parameter values for at least some of the equipment setup parameters.

14. The HVAC controller of claim 10, wherein the controller is further configured to display a list of possible wire types so that the user can indicate which wires are currently being used, and an order in which the possible wire type are listed is based at least in part upon the geographical location.

15. A method of configuring an HVAC controller to operate one or more components of an HVAC system, the HVAC controller including a controller operably coupled to a user interface, the method comprising:
displaying on the user interface an inquiry asking a user to identify a geographical location for the HVAC controller;
receiving an identified geographical location from the user in response to the inquiry;
displaying on the user interface an inquiry comprising a list of two or more possible parameter values for one of a plurality of equipment setup parameters, wherein an ordering for the two or more possible parameter values in the list is determined based at least in part upon the identified geographical location;
receiving a response to the inquiry from the user;
determining the one of the plurality of equipment setup parameters based on the response, wherein the plurality of equipment setup parameters is usable by the HVAC controller in operating the one or more components of the HVAC system; and operating one or more components of the HVAC system based at least in part on the plurality of equipment setup parameters.

16. The method of claim 15, wherein the list of two or more possible parameter values comprises a list of HVAC system types that are most likely for the identified geographical location for selection by the user.

17. The method of claim 15, wherein the list of two or more possible parameter values comprises a list of HVAC fuel types that are most likely for the identified geographical location for selection by the user.

18. The method of claim 15, wherein the list of two or more possible parameter values comprises a list of HVAC controller brands that are most likely for the identified geographical location for selection by the user.

19. The method of claim 15, wherein the list of two or more possible parameter values comprises a list a list of possible wire types.

\* \* \* \* \*